Patented June 28, 1927.

1,633,874

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND, A FIRM.

CHROMABLE AZODYESTUFFS DERIVED FROM FORMALDEHYDE SULPHUROUS ACID AND NITRATED 1-(AZO-NAPHTHOL)-2-HYDROXY-NAPHTHALENE-4-SULPHONIC ACID AND PROCESS OF MAKING SAME.

No Drawing. Application filed July 21, 1926, Serial No. 124,097, and in Switzerland September 24, 1925.

The present invention relates to new chromable azo dyestuffs which are particularly valuable for producing fast tints on the animal fibre. The invention comprises the new dyestuffs, the method of making same, and the material dyed with the new dyestuffs.

The dyestuffs are made by treating with formaldehyde and a bisulfite, or with formaldehyde sulphurous acid or a salt thereof, the amino dyestuffs which are obtainable by reducing the products which are made by coupling the nitrated diazo compound of the 1-amino-2-oxynaphthalene-4-sulphonic acid with an unsulphonated naphthol such as α-naphthol or β-naphthol.

The new dyestuffs thus obtained correspond very probably with the general formula:

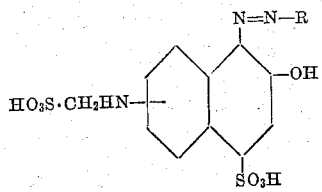

in which R stands for a residue of an unsulphonated naphthol. They are very well suited for dyeing animal fibre with aid of chromium mordant (according to the known chromium processes of mordanting with chromium and chroming), for they produce dyeings of prominent properties in respect of fastness. They form blackish powders, which dissolve in water to violet-brown solutions, in dilute caustic soda solution to black and in concentrated sulphuric acid to blue solutions.

Example.

450 parts by weight of the ortho-hydroxy-azo-dyestuff obtainable by reducing the product made by coupling the nitrated diazo-compound of 1-amino-2-hydroxynaphthalene-4-sulphonic acid with β-naphthol are dissolved, preferably in the form of the reduction mass freshly obtained, in about 8000 parts of water at 50° C. containing 45 parts of caustic soda; a mixture of 100 parts of formaldehyde of 35 per cent strength and 285 parts of sodium bisulphite liquor of 40 per cent strength are added. After stirring for some time acetic acid of 10 per cent strength is added until the intense blue of the solution is changed to violet; salting out and filtration then follow. When dry the new product is a black powder which dissolves in water to a violet-brown solution, in dilute caustic soda solution to a black and in concentrated sulphuric acid to a blue solution. In contrast with the parent dyestuff the new product is soluble in cold water and remains dissolved even after addition of mineral acid to the solution, therefore it may be dyed in a sulphuric acid bath. It corresponds very probably with the formula:

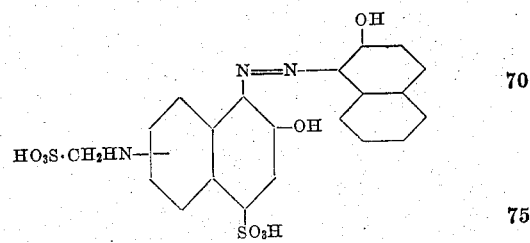

The isomeric dyestuff from α-naphthol shows similar properties.

What we claim is:

1. As a new process the treatment of the dyestuffs obtainable by reducing the coupling products of the nitrated diazo-derivative of 1-amino-2-oxynaphthalene-4-sulphonic acid with an unsulphonated naphthol, with the reaction product of bisulphite on formaldehyde.

2. As a new process the treatment of the dyestuffs obtainable by reducing the coupling products of the nitrated diazo-derivative of 1-amino-2-oxynaphthalene-4-sulphonic acid with β-naphthol, with the reaction product of bisulphite on formaldehyde.

3. As new products the herein described new azo dyestuffs corresponding very probably with the general formula:

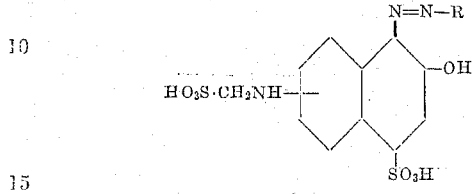

wherein R stands for the residue of an unsulphonated naphthol, which products form black powders which dissolve in water to violet-brown solutions, in dilute caustic soda solution to black and in concentrated sulphuric acid to blue solutions, and which dye wool, when afterchromed, very fast black shades which are particularly fast to potting.

4. As a new product the herein described new azo dyestuff corresponding very probably with the formula:

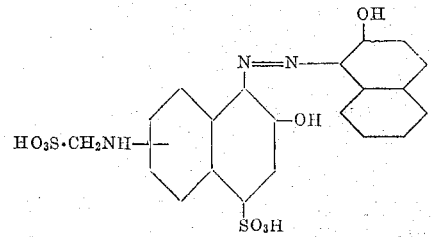

which product forms a black powder which dissolves in water to a violet-brown solution, in dilute caustic soda solution to a black and in concentrated sulphuric acid to a blue solution, and which dyes wool, when afterchromed, a very fast black shade which is particularly fast to potting.

In witness whereof we have hereunto signed our names this 10th day of July 1926.

FRITZ STRAUB.
HERMANN SCHNEIDER.